United States Patent [19]
Snyder, Jr.

[11] 3,897,538
[45] July 29, 1975

[54] PRODUCTION OF GALLIUM OXIDE
[75] Inventor: Harry C. Snyder, Jr., Belleville, Ill.
[73] Assignee: Aluminum Company of America, Pittsburgh, Pa.
[22] Filed: May 22, 1972
[21] Appl. No.: 255,521

[52] U.S. Cl. .............................. 423/122; 423/124
[51] Int. Cl. ............................................. C01g 15/00
[58] Field of Search ........... 423/120, 121, 122, 624, 423/625, 124; 23/301 R

[56] References Cited
UNITED STATES PATENTS

| | | | |
|---|---|---|---|
| 1,943,786 | 1/1934 | Cowles | 423/625 |
| 2,574,008 | 11/1951 | Beja | 423/121 |
| 2,582,376 | 1/1952 | Frary | 423/122 |
| 2,657,978 | 11/1953 | Johnson | 423/122 |
| 3,466,142 | 9/1969 | Hambly | 23/301 R X |

OTHER PUBLICATIONS

Shalavina, et al. "Cementation of Ga from Alkaline Solutions" Chemical Abstracts, Vol. 63, (1965) 11071(f).

Kasieva, et al. "Hydrolytic Decomposition of Sodium Gallocarbonate and Aluminocarbonate" Vol. 63, (1965), 10991(c) Chem. Abstr.

Primary Examiner—Oscar R. Vertiz
Assistant Examiner—Brian E. Hearn
Attorney, Agent, or Firm—Edward B. Foote

[57] ABSTRACT

Process for recovery of gallium from alkali metal aluminate solutions by co-precipitation of alumina and gallium oxide, followed by circulation of the co-precipitate in the solution for an extended period to effect precipitation of further gallium oxide.

2 Claims, No Drawings

PRODUCTION OF GALLIUM OXIDE

This invention relates to recovery of gallium oxide from alkali metal aluminate solutions which contain dissolved gallium.

PRIOR ART

It is known that sodium aluminate solutions containing a low concentration of dissolved gallium are produced in the well-known Bayer process for the production of alumina hydrate by repeated cycles of digesting bauxite in hot caustic soda solution, followed by precipitation of alumina hydrate by "seeding" the solution with previously precipitated alumina hydrate and recycling the solution to digest additional bauxite. Some of the gallium values present in the bauxite are dissolved, and the concentration of gallium in the solution gradually increases during repeated digests of bauxite in the solution, until an equilibrium is reached, usually at about 0.1–0.2 grams per liter, depending on the gallium content of the bauxite. It is also known that sodium aluminate solutions containing a relatively low concentration of dissolved gallium can be produced by dissolving in a caustic soda solution gallium-containing anode metal produced in the well-known three-layer electrolytic process for the purification of aluminum.

U.S. Pat. Nos. 2,574,008 and 2,582,376 describe recovering gallium oxide from such gallium-containing solutions by first decreasing the ratio of dissolved alumina to gallium in the solution, and thereafter co-precipitating alumina and gallium oxide from the solution by addition of an acid, such as carbon dioxide, though other acidic materials can be used. However, as the concentration of gallium in the solution becomes progressively lower in the course of such co-precipitation of alumina and gallium oxide, precipitation of additional gallium oxide becomes increasingly difficult and expensive, and eventually becomes uneconomical prior to precipitation of all of the gallium values present in the solution. As a result, a procedure for increasing the economically recoverable proportion of the gallium values is desirable.

THE INVENTION

It is an object of the invention to provide an improved procedure for recovering gallium oxide from alkali metal aluminate solutions containing a low concentration of dissolved gallium, and it is a particular object of the invention to increase the proportion of dissolved gallium values recoverable economically from sodium aluminate solutions from which gallium oxide is precipitated by feeding acid into the solution.

It has been found that after part of the gallium present in an alkali metal aluminate solution containing dissolved gallium has been precipitated from the solution as a co-precipitate of alumina and gallium oxide, additional gallium oxide can be precipitated from the solution by circulating the co-precipitated alumina and gallium oxide through the solution for an extended time. Thus, in accordance with this invention, alumina and gallium oxide are co-precipitated from an alkali metal aluminate solution containing dissolved gallium by adding an acid—preferably carbon dioxide or carbonic acid solution—to the solution and thereby precipitating part of the dissolved gallium values from the solution, after which the solution is agitated sufficiently to keep the co-precipitate circulating through it until the desired further precipitation of gallium oxide has been effected.

By circulating the co-precipitated alumina and gallium oxide in the solution for sufficient time, substantially all of the dissolved gallium present in the solution at the outset can be recovered, if desired. Prior to the above-mentioned step of co-precipitating alumina and gallium oxide by addition of acid to the solution, the ratio of alumina to gallium in the solution may be reduced by precipitating alumina from the solution by procedures disclosed in U.S. Pat. Nos. 2,574,008 and 2,582,376.

Circulation of the co-precipitate of alumina and gallium oxide in the solution to precipitate additional gallium oxide as described above can be effected by agitation of the solution rapidly by well-known stirring devices. The duration of circulation of the co-precipitate in the solution for the above purpose depends to some extent on such variables as the concentration of gallium in the solution, the ratio of circulated alumina-gallium oxide co-precipitate to dissolved gallium present, the proportion of the initial dissolved gallium to be recovered by circulation of the co-precipitated alumina and gallium oxide in the solution, and the rate at which the co-precipitate is circulated in the solution. However, precipitation of gallium oxide by circulation of the previously co-precipitated alumina and gallium oxide through the solution proceeds relatively slowly, and it has been found that circulation of the co-precipitate for a period of at least 15 hours is generally desirable, and a period of at least 30 hours is preferred. Following precipitation of the desired amount of additional gallium oxide by the procedures described above, the precipitated solids can be separated from the residual solution, as by decantation, sedimentation, or filtration.

As mentioned above, co-precipitation of alumina and gallium oxide from the gallium-containing sodium aluminate solution can be effected by introducing an acid into the solution. The rate and amount of acid introduced for best results will vary, depending on such factors as the particular acid used, and the proportion of the dissolved gallium values which it is economical to precipitate in that manner. It is generally advantageous to feed the acid into the solution rapidly.

The following examples illustrate the practice of the invention and increased recovery of gallium oxide.

EXAMPLE I

Carbon dioxide was fed into a solution containing 4.1 g/l of alumina, 11.0 g/l total caustic, and 0.152 g/l of dissolved gallium for 2 hours, thereby producing 91.4 g/l of sodium bicarbonate in the solution and co-precipitating sufficient alumina and gallium oxide that the solution contained essentially no dissolved alumina, and 0.110 g/l of dissolved gallium. Thereafter, the co-precipitated alumina and gallium oxide were kept suspended in the solution and circulated through it for 72 hours by agitation of the solution and precipitate, but without adding further carbon dioxide. At the end of 24 hours sufficient additional gallium oxide had been precipitated that the solution contained 0.04 g/l of dissolved gallium; at the end of 72 hours the solution contained only 0.014 g/l of dissolved gallium.

EXAMPLE II

Carbon dioxide was bubbled through a sodium aluminate solution of the composition described in Example I for two hours, co-precipitating enough alumina and gallium oxide that the resultant solution contained .006 g/l of alumina, 0.096 g/l of gallium, and 95.4 g/l of sodium bicarbonate. The co-precipitate was filtered immediately from the solution, after which the solution was stirred for 64 hours at 54°C. At the end of that time, no additional alumina or gallium values had precipitated from the solution.

The above-mentioned co-precipitated alumina and gallium oxide which had been removed from the solution was then returned to the solution and the mixture was stirred for 96 hours at 54°C at the same rate as before, thereby keeping the co-precipitate suspended in the solution. At the end of 24 hours the solution contained 0.035 g/l of dissolved gallium; at the end of 96 hours, it contained only 0.017 g/l of dissolved gallium.

I claim:

1. In the process of recovering gallium oxide from an alkali metal aluminate solution containing dissolved gallium, which comprises co-precipitating alumina and part of the gallium oxide by introducing into the solution an acid capable of effecting such co-precipitation, the improvement comprising circulating the co-precipitated alumina and gallium oxide through the solution for a period of at least 15 hours, whereby additional gallium oxide is precipitated from the solution.

2. A process in accordance with claim 1 in which the said period is at least 30 hours.

* * * * *